Oct. 16, 1923.

C. D. BROWN

BRAKE MECHANISM FOR AUTOMOBILES

Filed Dec. 6, 1922

1,470,905

Inventor:
Chauncy D. Brown,

By C. C. Hines,

Attorney.

Patented Oct. 16, 1923.

1,470,905

UNITED STATES PATENT OFFICE.

CHAUNCY D. BROWN, OF WARRENTON, VIRGINIA.

BRAKE MECHANISM FOR AUTOMOBILES.

Application filed December 6, 1922. Serial No. 605,283.

*To all whom it may concern:*

Be it known that I, CHAUNCY D. BROWN, a citizen of the United States, residing at Warrenton, in the county of Fauquier and State of Virginia, have invented new and useful Improvements in Brake Mechanism for Automobiles, of which the following is a specification.

This invention relates to brake mechanism for automobiles, and particularly to improvements in emergency brakes for motor vehicles of the Ford type, in conjunction with which it is particularly adapted to be used.

In the Ford type of brake mechanism, a hand-operated emergency brake is employed which is coupled to the clutch and which, when moved forward, will throw the clutch into high gear. This lever is designed to be held in set position by means of a locking dog or pawl thereon engaging a rack segment on the vehicle, said dog being releasable by means of a finger piece and connecting rod to permit the lever to be shifted. The dog is held in rack engaging position by the gravity of the finger piece and connecting rod and sometimes by the use of a spring acting on the finger piece, but it is well known that there are certain objections to the brakes with which Ford cars are commonly equipped.

In the Ford brake mechanism, the brake ratchets have insufficient holding engagement, making the brake too sensitive to shocks or jars which may cause accidental release of the brakes. Wear and tear upon the ratchet teeth also render the brakes further unreliable in this respect. For these reasons, it is the common experience in the operation of Ford cars to have the emergency brake release when the car is standing, with the result that the emergency brake lever will move forward and throw the clutch into high gear, so that upon the starting of the engine the car will plunge forward and collide with the operator or cause other damage. In other cases the emergency brake lever is liable to become accidentally released under jars or vibrations, thus releasing the brakes and causing accidents of more or less serious nature.

The object of my invention is to provide a simple, reliable and efficient construction of safety attachment for the brake mechanism of Ford cars, by which the emergency brake lever dog will, at all times, be held in proper locking engagement with the rack segment, except when it is manually released, thus preventing accidental release of the brake lever from shocks, vibrations or other similar causes.

A further object of the invention is to provide a simple and inexpensive type of safety spring, which may be applied in a direct manner to the brake mechanism, to function as described, without other addition to or modification of the parts of the brake mechanism.

The invention consists of the features of construction, combination and arrangement of parts, hereinafter fully described and claimed, reference being had to the accompanying drawing, in which:—

Figure 1:
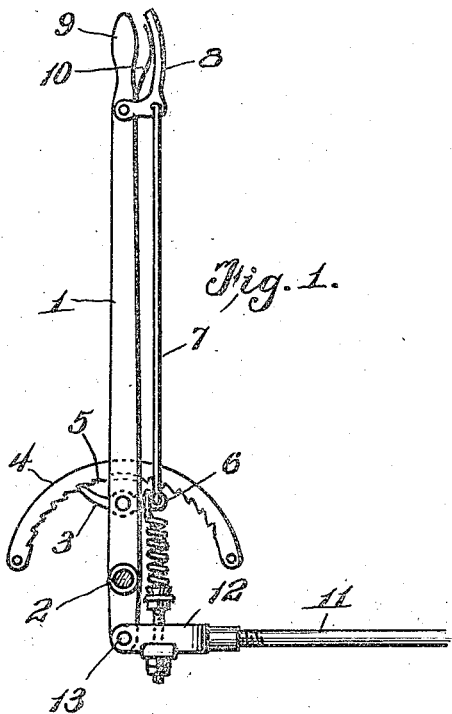
Figure 1 is a side elevation of the emergency brake of a Ford car, showing my attachment applied thereto.
Figure 2:
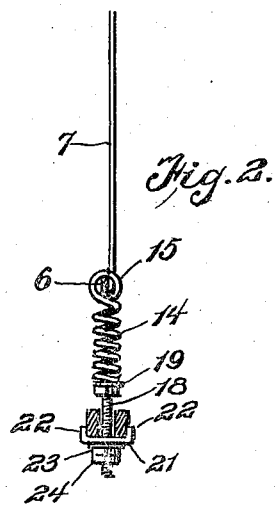
Figure 2 is a vertical transverse section through the brake rod and portions connected therewith.
Figure 3:
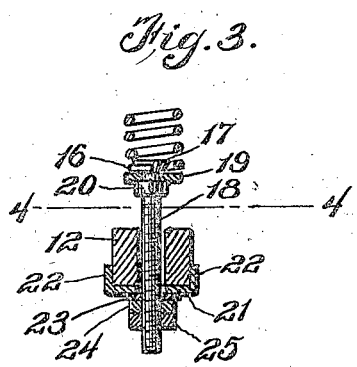
Figure 3 is a similar view on an enlarged scale.
Figure 4:
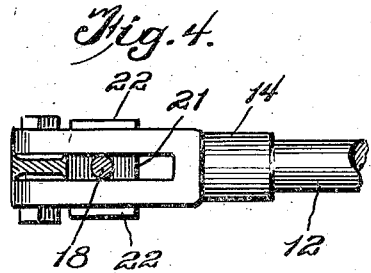
Figure 4 is a horizontal section on the line 4—4 of Figure 3.

Referring now more particularly to the drawing, 1 designates the emergency brake lever of the regular brake mechanism of a Ford car. This lever is pivotally mounted adjacent to its lower end, as indicated at 2, and carries, above its pivot point, a pivoted dog or pawl 3 adapted for interlocking engagement with the ratchet teeth of a rack segment 4, secured in practice upon the car frame or body. This dog or pawl 3 is centrally pivoted, having a toothed arm 5 for engagement with the rack teeth of segment 4 and a lever arm 6, said arms 5 and 6 projecting beyond opposite sides of the emergency brake lever 1. The arm 6 is coupled to the lower end of a connecting rod 7, which is pivotally coupled at its upper end to a pivoted finger piece 8 located opposite a grip or handle 9 at the upper end of lever 1. Movement of finger piece 8 toward the handle 9 causes the transmission of upward motion to the rod 7 to lift the lever arm 6 of the dog and swing the toothed arm 5 thereof downwardly, thereby moving said toothed arm 5 out of engagement with the teeth of segment 4 and releasing the lever 1 for forward or rearward swinging movements. In some forms of construction the gravity of the parts 7 and 8 is relied upon to hold the toothed arm 5 of the pawl 3 in locking position, and in others a leaf spring 10, disposed between the finger piece 8 and handle 9, is provided for action on said finger piece for holding the dog in locking position.

The lever 1 is pivotally coupled at its lower end, below the pivot point 2, with the forward end of a brake rod 11, whereby said rod is adapted to be moved forwardly or rearwardly through movements of the lever 1 to apply or release the brakes. A coupling connection between the lever 1 and rod 11 is provided comprising a forked bracket or yoke 12, the arms of which, at their forward ends, straddle the lever 1 and are pivotally connected therewith by a pin or pivot member 13, the opposite ends of the yoke arms being joined and provided with a threaded socket to receive the threaded forward end of the rod 11. I provide a safety spring connection between this yoke member 12 and the lever arm 6 of the pawl or dog 3, whereby, under all service conditions, the toothed arm of the dog 3 is held in locking engagement with the rack 4 against any possibility of accidental disengagement, while at the same time said spring connection permits the dog or pawl being manually operated through the medium of the finger piece 8 for the purpose of releasing the lever 1 for positive operating movements when occasion requires.

The spring connection referred to comprises a coiled spring 14 disposed along side and parallel with the lower portion of lever 1. This spring is provided at its upper end with an eye 15 which embraces the lever arm 6 of the pawl or dog 3 and secures the spring thereto. Primarily this eye 15 may be in the form of a hook or open eye to enable it to be fitted in position about the arm 6 and then closed into permanent eye form to hold it positively from disconnection. The lower end of spring 14 is formed to provide an eye 16 lying adjacent to a superposed coil thereof. This eye 16 embraces the head 17 of a screw bolt 18, and is of smaller diameter than the major portion of said head. Surrounding the shank of the screw below said eye 16 is a washer 19 bearing on said eye, and fitted on the bolt is a clamping nut 20 bearing against said washer and holding the eye 16 pressed against the screw head 17, thus firmly fastening the parts in position. The screw head projects between the eye 16 and the superposed coil of the body of the screw, and said coil thus acts as an additional clamping medium to ensure a firm connection between said parts. The screw thence extends downwardly between the arms of the yoke 12 and through an opening in a clamping plate 21 bearing against the underside of said yoke. This plate extends across the yoke and is formed with upstanding flanges 22 bearing against the outer side of the yoke arms, thus holding said plate from pivotal motion. Bearing against the underside of the clamping plate is a split spring washer 23 secured in position by a fastening nut 24 which in turn is locked in adjusted position by means of a jamb nut 25, whereby the screw bolt is fastened to the yoke 12 to hold the lower end of the spring coupled thereto. It will be observed that this construction provides an adjustable connection between the yoke and spring, whereby the tension of the spring may be varied as desired to regulate its strength of action upon the dog or pawl 3, allowing the spring connection to be adjusted as required to hold the dog with greater or less force in engagement with the teeth of the rack as circumstances may require to secure positive locking action. The connection described also allows a slight tilting or rocking motion of the fastening unit 18—21 of the spring on the yoke 12, to eliminate liability of strain upon the fastening connection, and to compensate for vertical up and down movements of the rod 4 as it is moved back and forth in the arc of swing of the lower end of lever 1.

It will be understood from the foregoing description that by the provision of the spring connection 14 between the rod 11 and the lever arm 6 of dog 3, the contractile energy of the spring will at all times be exerted to hold the toothed arm 5 of said dog in engagement with the teeth of rack 4, this locking connection being secure enough to obviate all liability of the lever being accidentally shifted out of a set position as a result of any jars, jolts or vibrations which may occur through body movements of the vehicle or the running of the engine. Also that the tension of the spring may be regulated as desired to vary the locking action to compensate for wear upon the dog and ratchet teeth, so that the device may be used on new or old cars with equal efficiency and reliability. It will further be seen that the device ensures safety in the locking action, in preventing accidental movement of the lever 1 out of brake applying position, thus preventing any possibility of the clutch being shifted accidentally into high gear when the engine is cranked or running while the vehicle is standing, and causing injury to persons or damage to the car or other property. An important advantage residing in my improved attachment, and the combinative coaction of parts established thereby, is that the device may be furnished at small cost and installed for use without in any manner changing the construction of the standard parts of the brake mechanism or adding supplemental parts thereto with the exception of the spring connection per se.

Having thus fully described my invention, I claim:—

1. In a brake mechanism of the character described, the combination of a pivoted brake lever, a brake rod coupled thereto, a rack, a pivoted dog or pawl carried by the lever to engage the teeth of the rack, manually operable means for manipulating said pawl, and a spring connection between the pawl and the brake rod operating to normally hold said pawl firmly in locking position.

2. In a brake mechanism of the character described, the combination of a pivoted brake lever, a brake rod coupled thereto, a rack, a pivoted dog or pawl upon the lever to engage the teeth of the rack, manually operable means for manipulating said pawl, a spring connection between the pawl and the brake rod for normally holding said pawl firmly in locking position, and means forming part of said connection for regulating the tension of the spring.

3. In a brake mechanism of the character described, the combination of a pivoted brake lever, a brake rod coupled thereto, a rack, a dog or pawl centrally pivoted to the lever and having a toothed arm projecting beyond one side of the lever to engage the rack and a lever arm projecting beyond the other side of the lever, manually operable means connected with said lever arm for manipulating said pawl, and a spring connection between said lever arm of the pawl and the brake rod for normally holding the toothed arm of said pawl in firm locking engagement with the teeth of the rack.

4. In a brake mechanism of the character described, the combination of a pivoted brake lever, a brake rod pivotally coupled thereto, a rack, a dog or pawl pivoted to the lever and having a lever arm and a toothed arm, the latter-named arm adapted to engage the teeth of the rack, manually operable means connected with said lever arm for manipulating said pawl, a spring connected at one end with the lever arm of the pawl, and a fastening connection between the other end of the spring and the brake rod adjustable to regulate the tension of said spring.

5. In a brake mechanism of the character described, the combination of a pivoted brake lever, a brake rod, a yoke coupled to the rod and having spaced arms pivotally coupled to the lever, a rack, a pivotally mounted dog or pawl on the lever having a toothed arm at one side of the lever to engage the teeth of the rack and having a lever arm at the other side of said lever, manually operable means connected with said lever arm for manipulating said pawl, a spring having one end engaging the lever arm of the pawl, a clip embracing the yoke arms, a pawl connected with the other end of the spring and extending downward beyond the yoke arms and through said clip, and fastening means engaging the pawl and bearing against the clip and clamping the clip to the yoke arms and adjustably securing the spring to said yoke.

In testimony whereof I affix my signature in presence of two witnesses.

CHAUNCY D. BROWN.

Witnesses:
T. S. VANCE,
M. T. HART.